Nov. 20, 1923.
J. B. NICHOLSON
1,475,080
AUTOMATIC DIRIGIBLE LAMP SUPPORT
Filed Oct. 5, 1922
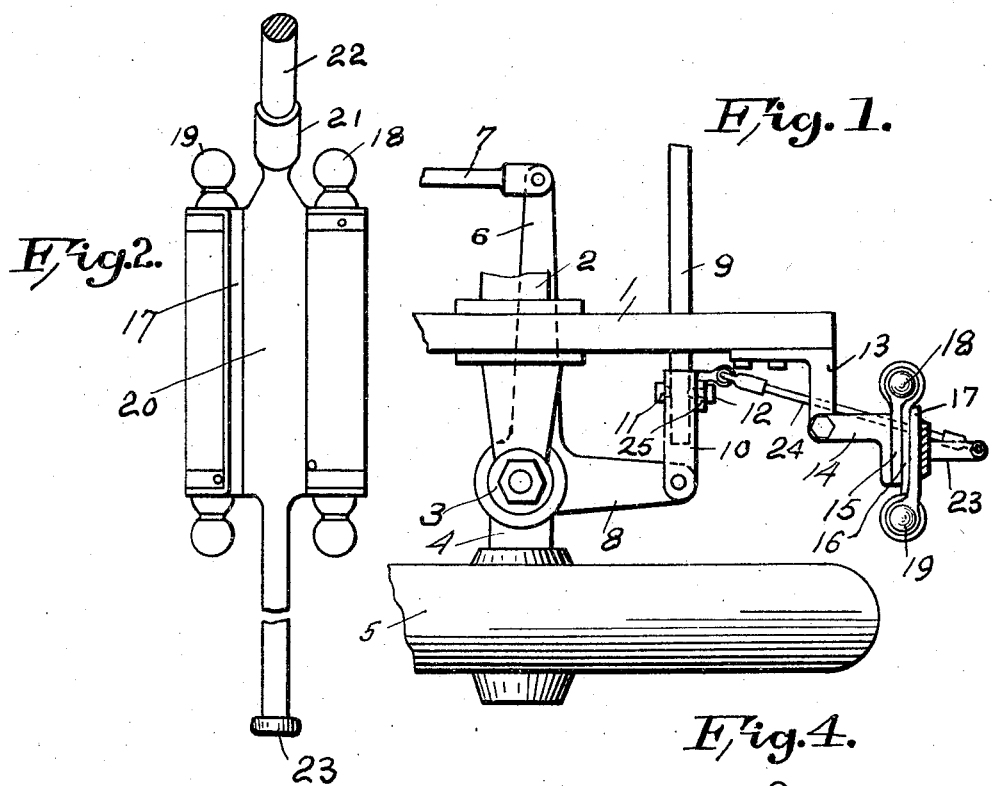
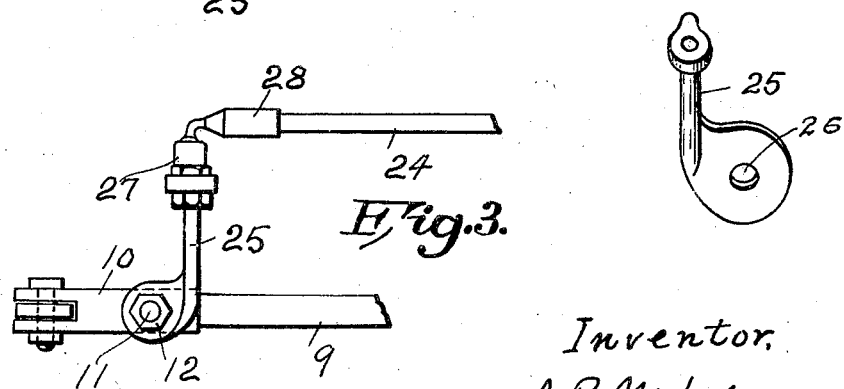
Inventor,
J. B. Nicholson
by A. P. Greeley
Attorney Patented Nov. 20, 1923.

1,475,080

UNITED STATES PATENT OFFICE.

JOSHUA B. NICHOLSON, OF WASHINGTON, DISTRICT OF COLUMBIA.

AUTOMATIC DIRIGIBLE LAMP SUPPORT.

Application filed October 3, 1922. Serial No. 592,077.

*To all whom it may concern:*

Be it known that I, JOSHUA B. NICHOLSON, a citizen of the United States, residing at Washington, in the District of Columbia, have invented certain new and useful Improvements in Automatic Dirigible Lamp Supports, of which the following is a description, reference being had to the accompanying drawings, forming a part hereof.

My invention relates to lamp supports for automobiles and other vehicles of the type known as automatic dirigible supports, and in which the lamp is caused to swing to the right or left as the automobile or other vehicle is steered to the right or left, in order to direct the beam of light in the direction in which the vehicle is steered so as to illuminate the path which is to be followed in turning a corner or traveling a curved roadway, and my invention has for its object to provide a lamp support of this character which will be simple and inexpensive in construction, will comprise very few parts and will be adapted to be readily and quickly attached to or removed from an automobile of usual construction without necessitating any changes in the construction of the automobile or any boring of holes or other expense or mutilation of the machine, the invention being particularly directed to the means for attaching the lamp supporting and operating means to the steering mechanism.

With the above described objects and other objects hereinafter explained in view, my invention consists in the construction and combination of elements hereinafter described and particularly pointed out in the claim.

Referring to the drawings:

Figure 1 is a plan view of a portion of the frame and steering mechanism of an automobile with the device of my invention applied to it.

Figure 2 is a front view of the lamp support.

Figure 3 is a detail view of the means for securing the lamp operating means to the steering mechanism.

Figure 4 is a detail perspective view of the bracket.

In the drawings 1 indicates a portion of the frame of an automobile of usual construction in which the front axle 2 is supported, the axle having at each end, outside the frame 1, the knuckle 3 for the stub axle 4 on which the wheel 5 is journaled. The stub axle has the usual inwardly extending arm 6 for connection with the steering rod 7, and the forwardly extending arm 8 for connection with the tie rod 9 which connects the two stub axles so that they will turn together. In the construction shown, which is a usual construction in automobiles, the end of the tie rod 9 extends into one end of a socket 10 the other end of which is pivotally connected to the end of arm 8 of the stub axle, the end of rod 9 being secured in the socket 10 by a bolt 11 which extends through the socket and the rod and is secured in place by nut 12.

To the front end of the frame 1 is secured, in the same position and by the same securing means used to secure the usual lamp supporting bracket in place, a bracket 13. To the free end of this bracket 13 is secured an arm 14 extending rearward from an upright plate 15 which serves as the back leaf of a double spring hinge of usual construction comprising this back leaf, the connecting leaf 16 and the front leaf 17, the leaf 15 being pivotally connected to one side of the connecting leaf 16 by pintle 18, and the leaf 17 being pivotally connected to the other side of the connecting leaf by pintle 19.

To the front face of the front leaf 17 is secured an upright 20 which serves as the support for the lamp. This upright 20 is provided at its upper end with a forwardly inclined socket 21 to receive the usual rod or pin 22 of the lamp. On its lower end the upright 20 is provided with a forwardly extending arm 23. To the end of this arm 23 is pivotally connected, by a ball and socket joint of usual construction, the forward end of an operating rod 24 the rear end of which is pivotally connected, also by a ball and socket joint, with the socket 10 of the tie rod 9. The means for connecting this rear end of the operating rod with the socket 10 consists of a bracket 25 of the shape shown having its lower end provided with an opening 26 adapted to fit over the bolt 11 and be secured thereon by the nut 12, and having its upper end bent forward and provided with an opening 28 adapted to have secured to it the socket 27 of the ball and socket connection carried by the socket in which is secured the rear end of the operating rod 24.

In order to substitute, in an automobile of ordinary construction, the swinging or dirigible lamp support above described all that is necessary is to remove the usual rigid lamp support bracket and put in place of it the bracket 13 using the same bolt holes in which the bolts of the rigid lamp support bracket were secured, and to remove the nut 12, place the bracket 25 with its opening 26 over the bolt 11, and replace the nut 12.

If, at any time, it is desired to dispense with the swinging movement of the lamp, all that needs to be done is to detach the sockets at the ends of the operating rod 24 from the arm 23 and the bracket 25, the double spring hinge holding the lamp support in fixed position.

In operation the movement of the socket 10 of the tie rod will, by the operating rod 24, be communicated to the arm 23 of the support 20 which will cause this support with the front leaf 17 to swing to the right or left, as the case may be, turning on the pintle 18 or the pintle 19.

Having thus described my invention what I claim is:

In an automatic dirigible lamp support for motor vehicles, the combination with an upright adapted to carry the lamp and having a forwardly extending arm on its lower end, a vertical double spring hinge carrying said upright, a bracket secured to the frame of the machine and carrying the hinge, a second bracket having its lower end flattened and provided with an opening adapted to fit over the bolt securing the tie rod in the socket attached to the stub axle and adapted to be secured on said bolt by the nut carried by it, a rod having sockets at its ends, the other end of the second bracket being connected with one socket of the connecting rod and the second socket being connected with the forwardly extending arm on the upright carrying the lamp.

In testimony whereof I affix my signature.

JOSHUA B. NICHOLSON.